United States Patent
Locker et al.

(10) Patent No.: US 11,883,768 B2
(45) Date of Patent: *Jan. 30, 2024

(54) METHODS AND APPARATUS FOR PLUGGING CELLS OF CERAMIC STRUCTURES AND HONEYCOMB FILTERS

(71) Applicant: CORNING INCORPORATED, Corning, NY (US)

(72) Inventors: Robert John Locker, Corning, NY (US); Robert Arthur McIntosh, Corning, NY (US); Joel Andrew Schultes, Corning, NY (US)

(73) Assignee: Corning Incorporated, Corning, NY (US)

( * ) Notice: Subject to any disclaimer, the term of this patent is extended or adjusted under 35 U.S.C. 154(b) by 440 days.

This patent is subject to a terminal disclaimer.

(21) Appl. No.: 17/264,219

(22) PCT Filed: Jul. 15, 2019

(86) PCT No.: PCT/US2019/041755
§ 371 (c)(1),
(2) Date: Jan. 28, 2021

(87) PCT Pub. No.: WO2020/028017
PCT Pub. Date: Feb. 6, 2020

(65) Prior Publication Data
US 2021/0316242 A1 Oct. 14, 2021

Related U.S. Application Data

(60) Provisional application No. 62/712,376, filed on Jul. 31, 2018.

(51) Int. Cl.
*B01D 46/00* (2022.01)
*B01D 46/24* (2006.01)
*B28B 11/00* (2006.01)

(52) U.S. Cl.
CPC ..... *B01D 46/0001* (2013.01); *B01D 46/2459* (2013.01); *B28B 11/007* (2013.01); *B01D 2279/30* (2013.01)

(58) Field of Classification Search
CPC ............ B01D 46/0001; B01D 46/2459; B01D 2279/30; B01D 46/2418; B28B 11/007; B29C 70/766
See application file for complete search history.

(56) References Cited

U.S. PATENT DOCUMENTS

| | | | |
|---|---|---|---|
| 4,427,728 A | 1/1984 | Belmonte et al. | |
| 4,557,962 A | 12/1985 | Belmonte et al. | |
| (Continued) | | | |

FOREIGN PATENT DOCUMENTS

| | | | |
|---|---|---|---|
| CN | 104207792 A | * | 12/2014 |
| EP | 2105185 A2 | | 9/2009 |
| (Continued) | | | |

OTHER PUBLICATIONS

International Search Report and Written Opinion of the International Searching Authority; PCT/US19/41755; dated Nov. 14, 2019; 11 Pages; European Patent Office.

*Primary Examiner* — S. Behrooz Ghorishi
(74) *Attorney, Agent, or Firm* — Joseph M. Homa (57) ABSTRACT

A method for plugging a subset of cells of a honeycomb structure that includes: covering a first end face of the honeycomb structure with a mask that comprises a body and a plurality of openings, wherein the plurality of openings of the mask is coincident with a plurality of cells of the honeycomb structure; providing a plug of material upon a film material; applying a force to the film material with a piston to push the plug of material through the plurality of openings of the mask and into the plurality of cells of the honeycomb structure; and measuring a plurality of pressures (Continued)

within the plurality of cells of the honeycomb structure during the applying step.

18 Claims, 8 Drawing Sheets

(56) References Cited

U.S. PATENT DOCUMENTS

| | | |
|---|---|---|
| 4,752,516 A | 6/1988 | Montierth |
| 5,021,204 A | 6/1991 | Frost et al. |
| 6,673,300 B2 | 1/2004 | Allen et al. |
| 6,699,428 B2 | 3/2004 | Nishi et al. |
| 7,537,634 B2 | 5/2009 | Hatano et al. |
| 7,611,560 B2 | 11/2009 | Ichikawa |
| 7,722,791 B2 | 5/2010 | Kimura et al. |
| 7,736,581 B2 | 6/2010 | Ito et al. |
| 7,807,085 B2 | 10/2010 | Tsuji et al. |
| 7,919,033 B2 | 4/2011 | Shoji et al. |
| 7,922,951 B2 | 4/2011 | Mudd et al. |
| 8,003,035 B2 | 8/2011 | Ito et al. |
| 8,038,817 B2 | 10/2011 | Kawai et al. |
| 9,822,681 B2 | 11/2017 | Kikuchi et al. |
| 2004/0130335 A1* | 7/2004 | Shimizu ............ G06V 40/1306 324/661 |
| 2005/0076991 A1 | 4/2005 | Fujita |
| 2006/0131782 A1* | 6/2006 | Mudd ................ B01D 46/2418 425/129.1 |
| 2007/0184241 A1 | 8/2007 | Ichikawa |
| 2007/0220855 A1 | 9/2007 | Ichikawa |
| 2008/0128082 A1 | 6/2008 | Masuda et al. |
| 2008/0251978 A1 | 10/2008 | Ito et al. |
| 2013/0140736 A1 | 6/2013 | Uoe et al. |
| 2018/0222083 A1* | 8/2018 | Nagai ................ C04B 38/0012 |

FOREIGN PATENT DOCUMENTS

| | | |
|---|---|---|
| JP | S6276785 * | 4/1987 |
| WO | 2011/106758 A1 | 9/2011 |
| WO | 2012/111675 A1 | 8/2012 |

* cited by examiner

METHODS AND APPARATUS FOR PLUGGING CELLS OF CERAMIC STRUCTURES AND HONEYCOMB FILTERS

This is a national stage application under 35 U.S.C. § 371 of International Application No. PCT/US2019/041755, filed on Jul. 15, 2019, which claims the benefit of priority under 35 U.S.C. § 119 of U.S. Provisional Application Ser. No. 62/712,376 filed on Jul. 31, 2018, the content of which is incorporated herein by reference in its entirety.

FIELD OF THE DISCLOSURE

The present disclosure is in the field of manufacturing technical ceramic structures, and particularly relates to methods and apparatus for selectively plugging cells of ceramic structures and honeycomb filters.

BACKGROUND

Various manufacturing processes and methods of making ceramic structures and honeycomb filters, e.g., ceramic filters are used in the automotive industry. These processes and methods employ steps and apparatus to seal selected ends and channels of these articles.

SUMMARY OF THE DISCLOSURE

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a film material having an outer edge that also extends outwardly of at least a portion of the outer edge of the first end face of the honeycomb structure; providing a plug of material upon the film material; applying a force to the film material with a piston to push the plug of material through the plurality of openings of the mask and into the plurality of cells of the honeycomb structure; and measuring a plurality of pressures within the plurality of cells of the honeycomb structure during the applying step.

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a film material having an outer edge that also extends outwardly of at least a portion of the outer edge of the first end face of the honeycomb structure; providing a plug of material upon the film material; applying a force to the film material with a piston to push the plug of material through the plurality of openings of the mask and into the plurality of cells of the honeycomb structure; and measuring a plurality of pressures within the plurality of cells of the honeycomb structure during the applying step, wherein the step of applying a force to the film material further comprises adjusting the force applied to the film material to develop a target pressure within the plurality of cells of the honeycomb structure, the target pressure based at least in part on the plurality of pressures within the plurality of cells of the honeycomb structure.

According to implementations of these aspects, the method for plugging a subset of cells of a honeycomb structure can also be conducted such that the step of measuring a plurality of pressures within the plurality of cells is conducted by evaluating output pressure data from a plurality of pressure sensors disposed on a pressure sensor film, the film disposed between the film material and the plug of material. Further, the plurality of pressure sensors can be disposed in a distribution on the pressure film that corresponds with a distribution of the plurality of cells of the honeycomb structure. In addition, the step of measuring plurality of pressures within the honeycomb structure can be conducted such that the plurality of pressures is a plurality of region pressures, each region pressure corresponding to a portion of the plurality of cells of the honeycomb structure.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the Drawings.

The foregoing summary, as well as the following detailed description of certain inventive techniques, will be better understood when read in conjunction with the figures. It should be understood that the claims are not limited to the arrangements and instrumentalities shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
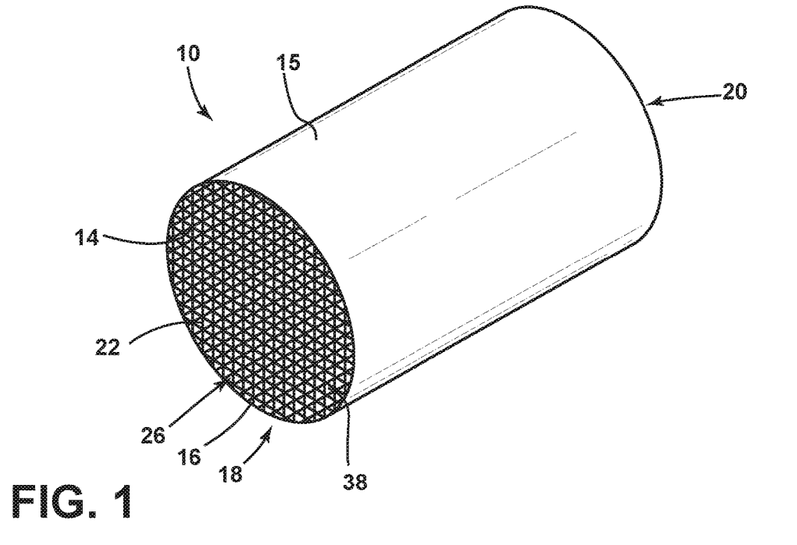
FIG. 1 is a perspective view of an extruded filter body comprising a first end and a second end having a plurality of open-ended cells.

Referring to the drawings in general and to FIG. 1, in particular, it will be understood that the illustrations are for the purpose of describing particular embodiments and are not intended to limit the disclosure appended claims thereto. The drawings are not necessarily to scale, and certain features and certain views of the drawings may be shown exaggerated in scale or in schematic form in the interest of clarity and conciseness.

The methods and apparatus for plugging cells of ceramic structures and filters are generally applicable to the production of any of a number of complex ceramic shapes having open-ended cells, channels, tubes or comparable features. Advantageously, the methods and apparatus of the disclosure allow for the continuous monitoring of the plugging apparatus by measuring and evaluating a plurality of pressures during the step of applying a plug of material into these structures and filters. As the plurality of pressure data is evaluated and averaged, real-time or subsequent off-line adjustments can be made to the plugging methods and apparatus (e.g., adjustments to the force applied to push a plug of material into a plurality of cells of the honeycomb structure) to improve the uniformity of plug length within the cells of the ceramic structures and filters. In turn, improved plug length uniformity can lead to improved part performance and higher production yields. Further, improved plug length control can lead to lower inspection costs and reduce production time.

Honeycomb structures having traverse cross-sectional cellular densities of approximately ten to one hundred cells or more per square centimeter have several uses, including solid particulate filter bodies and stationary heat exchangers. Wall flow particulate filter applications require selected cells of the structure to be sealed or plugged by a cement mixture, plug material and the like at one or both of the respective ends thereof. As used herein, the term "sealed" and other corresponding grammatical forms, i.e., sealant, sealing, etc., are used to refer to porous and non-porous methods of closing the open traverse cross-sectional areas of the cells of the ceramic structures, filters and bodies of the disclosure.

Figures 2, 2A:
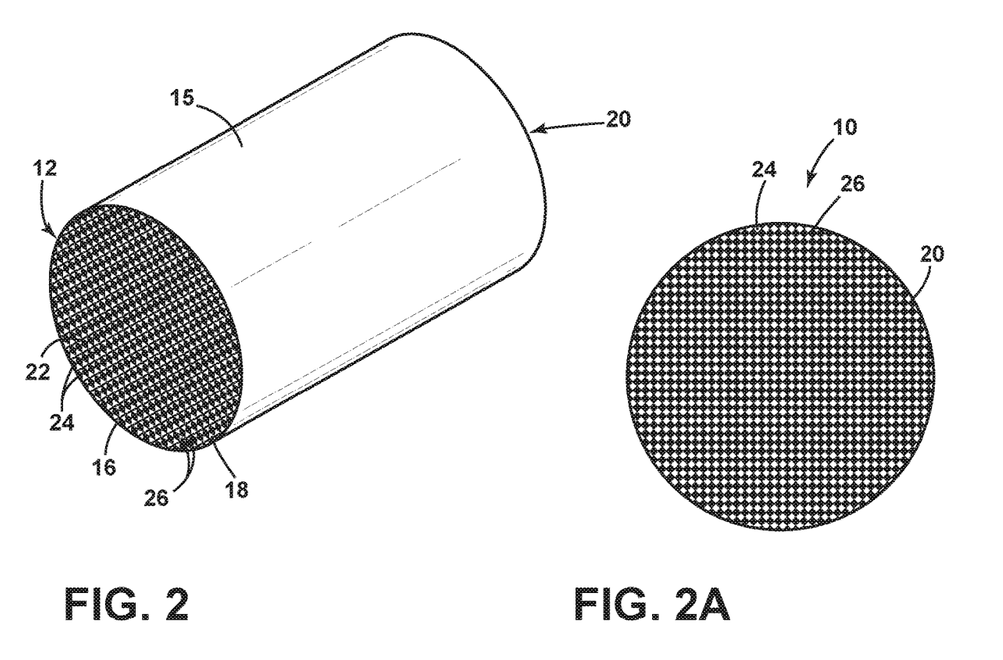
FIG. 2 is a perspective view of the first end of an extruded filter body configured comparably to the body depicted in FIG. 1, with a first subset of cells that are plugged, and a second subset of cells that are in an open-ended configuration.
FIG. 2A is a side view of the second end of the filter body of FIG. 2, with the first subset of cells that are in an open-ended configuration and the second subset of cells in a plugged configuration.

Referring now to FIG. 1, the reference numeral 10 generally designates a solid particulate ceramic filter body (also referred to herein as a "honeycomb structure"). The filter body 10 can be formed by a matrix of intersecting, thin, porous walls 14 surrounded by an outer wall 15, which in the illustrated example is provided in a circular cross-sectional configuration. The walls 14 extend across and between a first end face 18 and a plurality of cells 22. The cells 22 extend between and are open at the first end face 18 and the second end face 20, and form a large number of adjoining hollow passages in filter body 10. The outer wall 15 defines an outer edge 16 for both the first end face 18 and the second end face 20 (see also FIG. 2). Referring to FIGS. 2 and 2A, to plug the filter body 10, one end of each of the cells 22 is sealed with a plug of material, e.g., as according to a method 300 for plugging a subset of cells of a honeycomb structure to form a plugged honeycomb structure 200 (see FIG. 3 and further description below). In particular, a first subset 24 of the cells 22 is sealed at the first end face 18 (see FIG. 2), and a second subset 26 of the cells 22 is sealed at the second end face 20 of the filter body 10 (see FIG. 2A). Either the first end face 18 or second end face 20 may be used as the inlet face for the resulting filter body 10 in most configurations, e.g., when all of the cells 22 are of the same size.

In operation, contaminated fluid (e.g., particulate matter, such as exhaust soot) is brought under pressure to an inlet face (e.g., first end face 18 or second end face 20) and enters the filter 10 via those cells 22 which have an open end at the inlet face (e.g., a first subset 24 of the cells 22). Because these cells are sealed at the opposite end face, i.e., the outlet face (e.g., second end face 20 of the body 10), the contaminated fluid is forced through the thin porous walls 14 and into adjoining cells (e.g., a second subset 26 of the cells 22) which are sealed at the inlet face and open at the outlet face. The solid particulate contaminant in the fluid, which is too large to pass through the porous openings in the walls, is left behind and a cleansed fluid exits the filter 10 through the outlet cells, e.g., the second subset 26 of the cells 22.

Referring again to FIGS. 1, 2 and 2A, the honeycomb structures 10 for solid particulate filter bodies, and other applications, may be formed of a variety of materials comprising ceramics, glass-ceramics, glasses, metals, and by a variety of methods depending upon the material selected. Honeycomb structures, comprising the ceramic filter body 10, having the necessarily uniformed thin, porous and interconnected walls for solid particulate filtering applications are preferably fabricated from plastically formable and finely divided particles of substances that can be fired to yield a porous, sintered material. Suitable materials for the honeycomb structures and filter bodies 10 comprise metals, ceramics, glass-ceramics, and other ceramic based mixtures.

Figure 3:
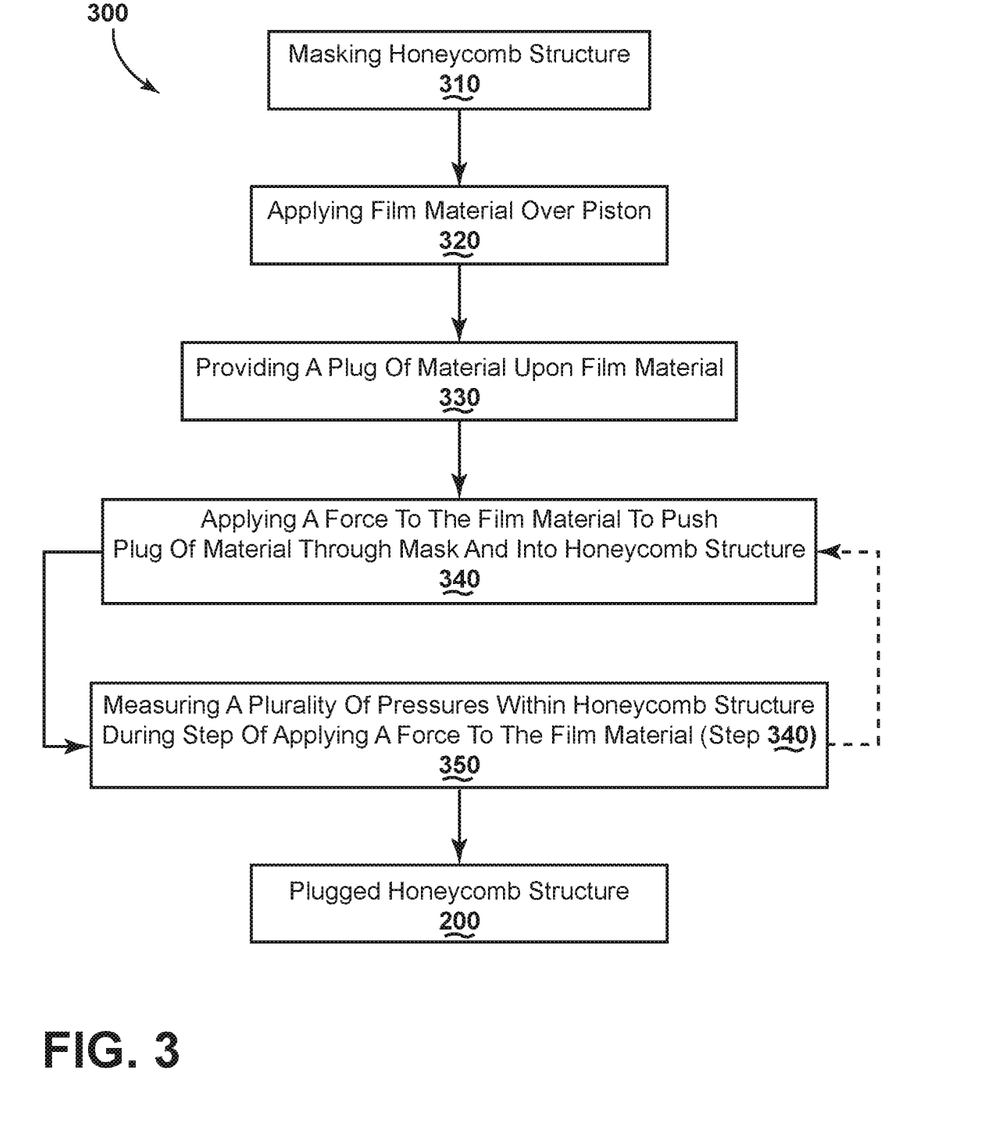
FIG. 3 is a schematic flow chart of a method for plugging a subset of cells of a honeycomb structure to form a plugged honeycomb structure.
Figure 4A:
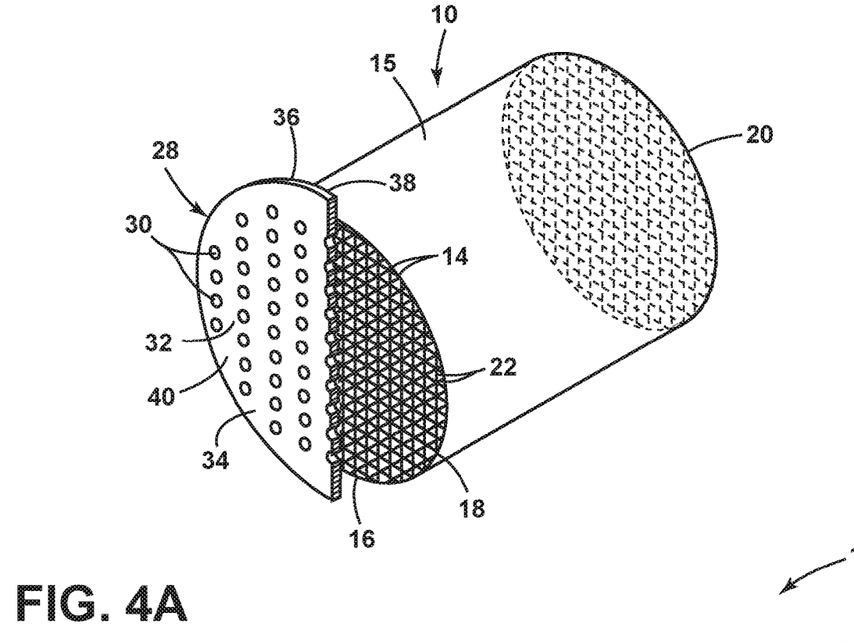
FIG. 4A is a perspective view of the first end of the extruded filter body of FIG. 2, as covered by a cross-sectioned mask.

Referring now to FIG. 3, a method 300 for plugging a subset of cells of a honeycomb structure 10 is provided. According to embodiments of the method 300, the method comprises a step 310 of masking a first end face 18 of the honeycomb structure 10 with a mask 28 that comprises a central body 32 having an outer edge 38 and a plurality of openings 30, wherein the outer edge 38 of the body extends 32 outwardly of at least a portion of an outer edge 16 of the first end face 18 of the honeycomb structure 10 and the plurality of openings 30 of the mask 28 is coincident with a plurality of cells 22 of the honeycomb structure 10 (see also FIG. 4A). According to embodiments of the method 300, either the first end face 18 or the second end face 20 of the honeycomb structure 10 is covered with the mask 28 as shown in FIG. 4A. In the illustrated example, the first end face 18 is covered by the mask 28 during step 310, and the mask 28 comprises an adhesive-backed, pressure-sensitive thin transparent or translucent film formed from a thermoplastic material, such as a polyester or polyethylene terephthalate (PET) material. Other materials are also suitable for the mask 28 comprising polyethylene, polypropylene, and polyurethane. Various processes can be employed to form a mask 28 of these materials, as would be understood by those of ordinary skill in the field of the disclosure. Further, the plurality of openings 30 are created through the mask 28 that correspond to the first subset 24 of the cells 22 or the second subset 26 of the cells 22 (see also FIGS. 2 and 2A). As would also be understood by those of ordinary skill in the field of the disclosure, the openings 30 can be created by any of a variety of means for opening such holes, depending on the material employed for the mask 28 (e.g., a laser tool, a stamping apparatus forming tool, a mold, etc.).

Referring again to step 310 of masking the honeycomb structure 10 (see FIGS. 3 and 4A), an exemplary mask 28 comprises a central body 32 with an outer face 34 and an opposing inner-face 36 with the plurality of openings 30 extending between the outer face 34 and the inner-face 36. In particular, the openings 30 are positioned within the body 32 of the mask 28 so as to coincide with the ends of the first subset 24 of the cells 22 (see FIGS. 2 and 2A) (e.g., when the mask 28 is employed over the first end face 18) or the second subset 26 of the cells 22 (see FIGS. 2 and 2A) (e.g., when the mask 28 is employed over the second end face 20) to be charged with plugging material (i.e., during step 340 as outlined in more detail below). The plurality of openings 30 of the mask 28 can be suitably sized to expose the open ends of the first subset 24 or second subset 26 of the cells 22, but not so large as to expose the adjacent subset of cells 22 (i.e., subset 26 or subset 24, respectively). In some embodiments, larger openings 30 can be provided to expose several adjacent cells 22, as desired. In addition, the mask 28 comprises an outer edge 38 and an outer periphery 40 that extends radially outwardly from the outer edge 16 of the first end face 18 (or the second end face 20 when the mask 28 is employed on this end). During the step 310, the body 32 of the mask 28 can be adhered to a matrix of walls 14 of the honeycomb structure 10 to hold the mask 28 in position. The mask 28, in some embodiments, can be adhered with acrylic adhesive (not shown) or any similar adhesive substance. In some implementations of the method 300, the adhesive can be applied to the mask 28 before step 310 of masking the honeycomb structure 10 is conducted.

Figure 4B:
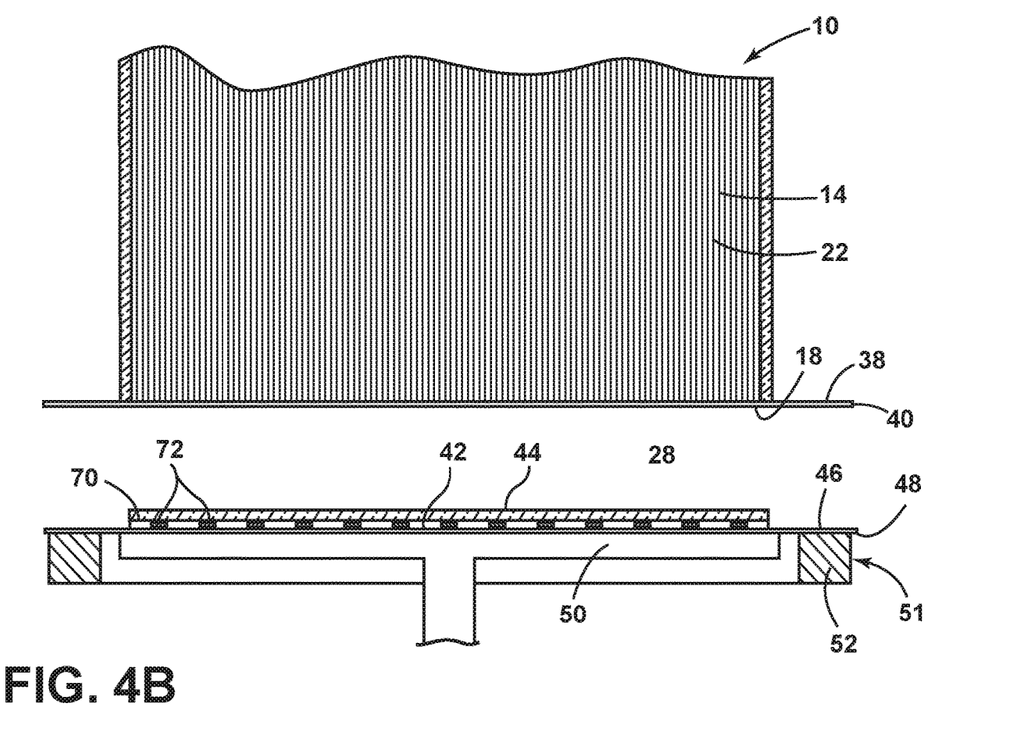
FIG. 4B is a side, cross-sectional view of the extruded filter body of FIG. 2, as covered by a mask, and a piston of a plugging apparatus, as covered by a film material, pressure sensor and a plug of material in patty form.

Now referring to FIGS. 3 and 4B, the method 300 for plugging a subset of cells of a honeycomb structure 10 further comprises a step 320 of providing a film material 42 over a piston 50 (or another comparable apparatus), as part of a plugging apparatus 100. Here, the film material 42 comprises a periphery 46 and an outer edge 48 that extends outwardly of at least a portion of the outer edge 16 (see FIGS. 1 and 2) of the first end face 18 of the honeycomb structure 10 (or the second end face 20 of the honeycomb structure 10 for embodiments in which the mask 28 is employed on the second end face 20). In some preferred embodiments, the film material 42 comprises a PET material. In other embodiments, the film material 42 comprises a thermoplastic material, such as polyester, PET, polyethylene, polypropylene, and polyurethane. In some aspects of the method 300, step 320 is conducted to ensure that the film material 42 is positioned over the piston 50 of the plugging apparatus 100 and relative to the honeycomb structure 10 to ensure that the pressure applied to the plug of material, or plugging material, 44 is substantially uniform during subsequent steps of the method 300, e.g., step 340 of applying a force to the film material 42.

Referring again to FIGS. 3 and 4B, the method 300 for plugging a subset of cells of a honeycomb structure 10 also comprises a step 330 of providing a plug of material 44 upon the film material 42. In embodiments, the plug of material 44 comprises a ceramic raw material with an aqueous binder, such as methylcellulose, plasticizer and water. As illustrated in FIG. 4B, the plug of material 44 is located with respect to the film material 42 such that the outer periphery 46 of the film material 42 is free from the plug of material 44. In embodiments, as shown in exemplary form in FIG. 4B, the plug of material 44 can be provided in the form of a flat patty with a uniform thickness. In other embodiments of the method 300, step 330 can be conducted such that the plug of material 44 is provided with a non-uniform thickness over the film material 42. In some implementations, the plug of material 44 is provided with a non-uniform thickness based at least in part upon pressure data obtained during step 350 of measuring a pressure within a plurality of cells 22 during step 340 (see below for further description of steps 340 and 350). Further, the pressure data employed in providing a plug of material 44 with a non-uniform thickness can be prior-obtained pressure data derived from the completion of other plugged honeycomb structures 200 according to the method 300. More specifically, any non-uniformities in the thickness of the plug of material 44 can be introduced, based at least in part on the pressure data, to offset any non-uniformities that exist in the apparatus employed in the method 300 to ensure that the length of the plug of material 44 in the first subset 24 and the second subset 26 of cells 22 (see FIGS. 1 and 2) is highly uniform.

Figure 4C:
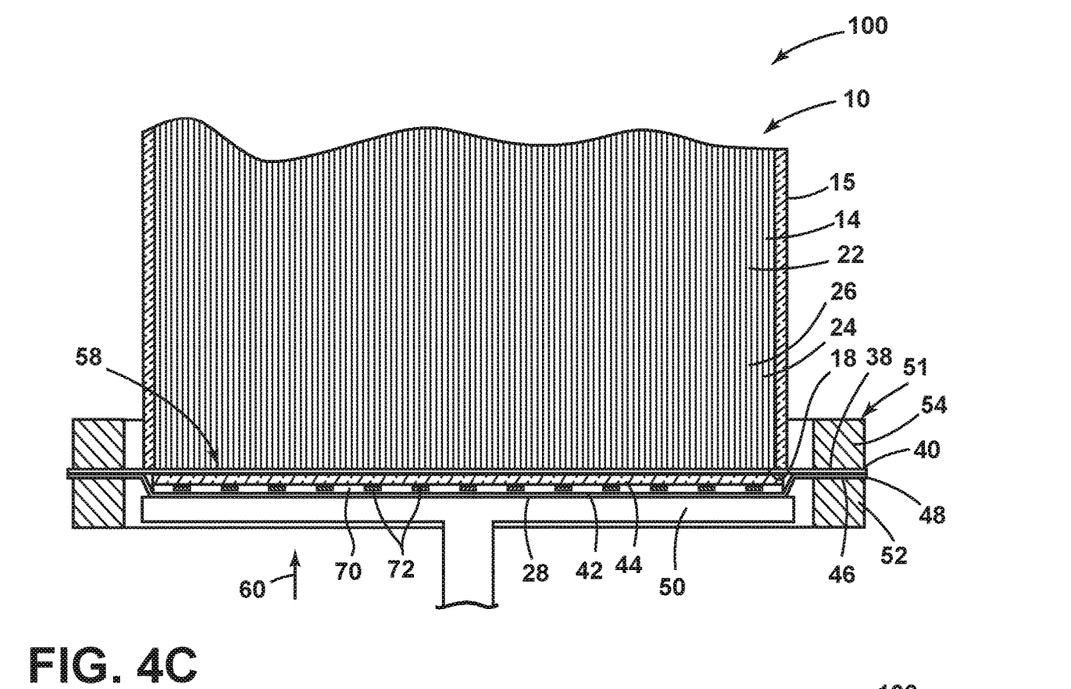
FIG. 4C is a side, cross-sectional view of the extruded filter body of FIG. 2, with the peripheral edges of the mask sealed with peripheral edges of a thin film.
Figure 4D:
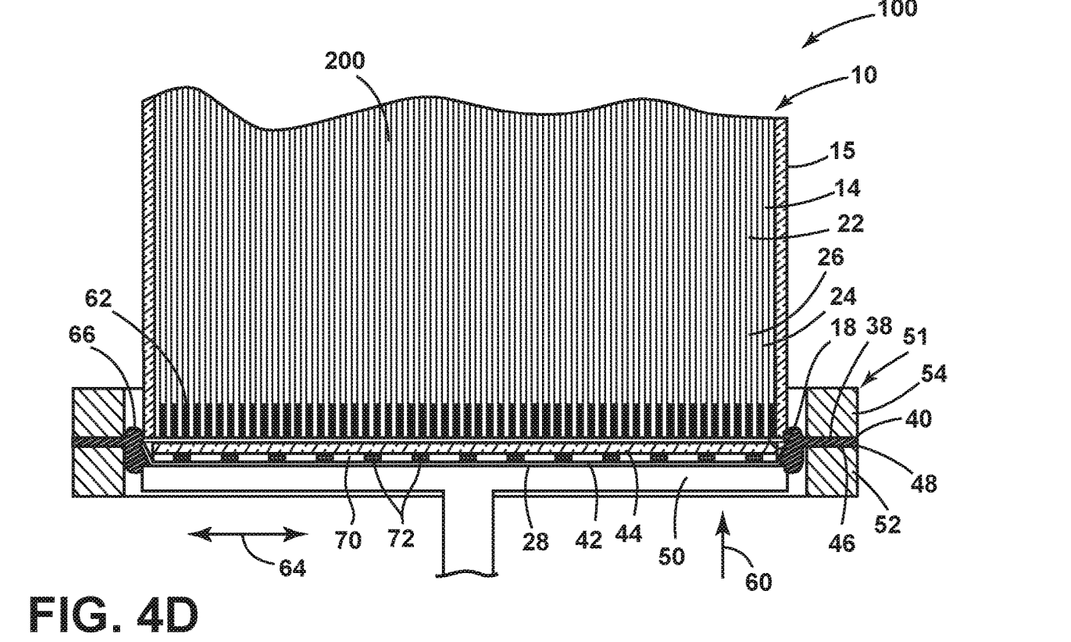
FIG. 4D is a side, cross-sectional view of the extruded filter body of FIG. 2, with the plug of material located within a subset of the cells of the filter body.

Again referring to steps 320 and 330 (see FIGS. 3 and 4B) of the method 300 for plugging a subset of cells of a honeycomb structure 10, the film material 42 with a plug of material 44 disposed thereon can be situated upon a piston 50 of the plugging apparatus 100, the piston 50 surrounded by a clamping assembly 51 having a first clamping portion 52 and a second clamping portion 54 (see also FIGS. 4C and 4D). The piston 50 can be shaped to correspond to the honeycomb structure 10 being plugged and is roughly of a comparable size to the part. The first clamping portion 52 and second clamping portion 54 of the clamping assembly 51 can be used to seal the periphery 46 of the film material 42.

Now referring to FIGS. 3, 4C and 4D, the method 300 for plugging a subset of cells of a honeycomb structure 10 further comprises a step 340 for applying a force 60 to the film material 42 to push the plug of material 44 through the plurality of openings 30 (see FIG. 4A) of the mask 28 and into the plurality of cells 22 of the honeycomb structure 10. In particular, the force 60 is generally applied in the direction as shown in FIGS. 4C and 4D to the film material 42 by the piston 50, thereby forcing the plug of material 44 through the openings 30 (see FIG. 4A) of the mask 28 and into the first subset 24 of the plurality of cells 22 (or second subset 26 of cells 22 for a mask positioned on the end face 20) of the honeycomb structure 10. As the plug of material 44 is pushed into the first subset 24 of cells 22, a plurality of plugs 62 is formed, as shown in FIG. 4D, thus converting the honeycomb structure 10 into a plugged honeycomb structure (see FIG. 3). In embodiments, excess of the plug of material 44 is forced laterally across the first end face 18 of the honeycomb structure 10 in a direction as indicated and represented by the directional arrow 64 and held within pockets 66 as defined by the outer periphery 40 of the mask 28 and the outer periphery 46 of the film material 42, and as located between the clamping assembly 51 and the piston 50. Further, the pocket 66 prevents any excess of the plug of material 44 from smearing along the outer wall 15 of the honeycomb structure 10. Also according to step 340, the piston 50 can be retracted away from the first end face 18 of the honeycomb structure 10 and the mask 28 and the film material 42 removed from the structure 10.

Referring again to FIGS. 3, 4C and 4D, the method 300 for plugging a subset of cells of a honeycomb structure 10 also comprises a step 350 for measuring a plurality of pressures within the plurality of cells 22 during the applying step 340. That is, a plurality of pressures is measured within the cells 22 during the step 340 for applying a force 60 to the film material 42 to push the plug of material 44 through the plurality of openings 30 (see FIG. 4A) of the mask 28 and into the plurality of cells 22. As such, step 350 can be employed to monitor a plurality of pressures in the first subset 24 of the cells 22 (or the second subset 26 of the cells) as the plug of material 44 is introduced into these cells. Further, according to some implementations of the method 300, the applying step 340 can further comprise adjusting the force 60 applied to the film material 42 (e.g., by the piston 50) based at least in part on the plurality of pressures within the plurality of cells 22 of the honeycomb structure 10 to push the plug of material 44 to a predetermined depth within the plurality of cells 22 (i.e., to form the plurality of plugs 62). Advantageously, the plurality of pressures measured during step 350 can be employed by the method 300 to monitor, adjust or otherwise control step 340 as the plug of material 44 is introduced into the honeycomb structure 10 to improve the uniformity of the depth of the plurality of plugs 62 formed in the structure 10.

In embodiments of the method 300 (see FIGS. 3 and 4B-4D), step 350 can be conducted such that output pressure data from a pressure sensor film 70 is evaluated. The pressure sensor film 70 can be disposed between the film material 42 and the plug of material 44, as depicted in FIGS. 4B-4D. Further, in embodiments, the pressure sensor film 70 can comprise a plurality of pressure sensors 72 (e.g., a sensor film as supplied by Tekscan™, Inc.). According to some implementations of the method 300, steps 340 and 350 are conducted such that the plurality of pressures measured within the plurality of cells 22 is a plurality of region pressures, with each region corresponding to a portion of the plurality of cells 22. Further, step 350 can be conducted such that multiple pressures are measured within the honeycomb structure 10, e.g., by virtue of a pressure sensor film 70 comprising a plurality of pressure sensors 72 (see FIGS. 4B-4D) that correspond to particular groups or regions of cells 22 at different locations on the first end face 18 (or second end face 20, as shown in FIG. 4A).

In other implementations of the method 300, the method can further comprise a step (not shown in FIG. 3) for monitoring the plurality of region pressures, with the monitoring being conducted such that the plurality of region pressures is recorded and displayed during completion of the method 300 (e.g., with a computer). Advantageously, the plurality of region pressures can be monitored in real-time during the completion of the method 300, allowing for immediate feedback in the consistency and control of the method over the production of many plugged honeycomb structures 200. According to a further implementation of the method 300, the method can further comprise a step of calculating an average pressure within the plurality of cells 22 based at least in part on the plurality of region pressures. Advantageously, an average pressure calculated in this fashion can be more representative of the pressure within the plurality of cells 22, as compared to a pressure obtained from a single or a handful of pressure sensors within a plugging apparatus 100 comparable to those depicted in FIGS. 4B-4D. Further, according to another implementation of the method 300, the method can further comprise a step of measuring a plurality of depths of the plurality of plugs 62 within the corresponding plurality of cells 22 (see FIG. 4D) with an x-ray computed tomography (CT) scanner after the step 340 of applying a force 60 to the film material 42. As such, the raw pressure data, average pressure data and plug depth information from these various permutations of the method 300 can be collectively employed to develop various real-time and off-line process-related characteristics of the method 300, as it is employed in the manufacturing of numerous plugged honeycomb structures 200.

According to some embodiments of the method 300 depicted in FIG. 3, step 350 can be conducted by evaluating output pressure data obtained from a plurality of pressure sensors 72 disposed on a pressure sensor film 70 (see FIGS. 4B-4D), the film 70 disposed between the film material 42 and the plug of material 44. In some aspects of these embodiments, the plurality of pressure sensors 72 can comprise at least ten (10) pressure sensors, 20 pressure sensors, 30 pressure sensors, 40 pressure sensors, 50 pressure sensors, 75 pressure sensors, 100 pressure sensors, 150 pressure sensors, 200 pressure sensors, 300 pressure sensors, 400 pressure sensors, 500 pressure sensors, 750 pressure sensors, 1000 pressure sensors, 1250 pressure sensors, 1500 pressure sensors, 1750 pressure sensors, 2000 pressure sensors, 2500 pressure sensors, and a number of pressure sensors 72 between these amounts. According to an implementation of the method 300, the plurality of pressure sensors 72 is at least 10%, 15%, 20%, 25%, 30%, 35%, 40%, 45%, 50%, 55%, 60%, 65%, 70%, 75%, 80%, 85%, 90%, or 95% of the total number of cells 22 of the honeycomb structure 10. In an embodiment, the plurality of pressure sensors 72 ranges from about 10% to about 50% of the total number of cells 22 of the honeycomb structure 10.

According to another implementation of the method 300, the plurality of pressure sensors 72 is disposed in a distribution on the pressure sensor film 70 that corresponds with a distribution of the cells 22 of the honeycomb structure 10. That is, the pressure sensors 72 can be positioned across the pressure sensor film 70 to substantially coincide with the plurality of cells 22 of the honeycomb structure 10 to ensure that they capture representative pressure data from these cells during step 350. In some aspects, the pressure sensors 72 are distributed within the pressure sensor film 70 at an equal spacing of about 1 mm, 1.5 mm, 2 mm, 2.5 mm, 3 mm, 3.5 mm, 4 mm, 4.5 mm, 5 mm, 6 mm, 7 mm, 8 mm, 9 mm, 10 mm, and all spacing between these values. In embodiments, the pressure data obtained from these distributed pressure sensors 72 can be employed to create a pressure map of the first end face 18 or second end face 20 of the honeycomb structure 10 that plots the multiple pressures measured as a function of location or region of portions of the cells 22 (see FIG. 6A and further description below). In addition, the method 300 can be conducted such that step 330 further comprises providing the plug of material 44 at a non-uniform thickness based at least in part on prior-measured output pressure data obtained from the step 350 (e.g., as obtained from a different honeycomb structure fabricated according to the method 300), as employing a pressure sensor film 70 with a plurality of pressure sensors 72.

In some implementations of the method 300 depicted in FIG. 3, the pressure data associated with these groups or regions of cells 22 obtained in the measuring step 350 can be evaluated according to the method 300 to calculate or otherwise set a target pressure for the plurality of cells 22 for purposes of conducting the applying step 340. According to some implementations, the target pressure is a lower bound pressure that is set to ensure that each of the plurality of plugs 62 has a minimum depth of the plug of material 44 within the cells 22 (see FIG. 4D) of the honeycomb structure. In some embodiments, the target pressure further comprises an upper bound pressure that is also set to ensure that each of the plurality of plugs 62 remains below a maximum depth of the plug of material 44 within the cells 22 (see FIG. 4D) of the honeycomb structure. In these embodiments, step 340 can be conducted by adjusting the force 60 applied to the film material 42 according to the target pressure for the plurality of cells 22. That is, the pressure data obtained during step 350, as associated with the plurality of cells 22, can be employed in real-time to effect changes to the step 340 of applying a force to the film material 42 to increase uniformity of the depth of the plurality of plugs 62 within the plurality of cells 22 of the honeycomb structure 10.

Referring now to FIGS. 3 and 4D, the method 300 can be employed, upon completion of steps 310-350, to produce a plugged honeycomb structure 200, e.g., with a plurality of plugs 62 as located within a first subset 24 and a second subset 26 of cells 22. At this point, the plugged honeycomb structure 200 can be removed from within the plugging apparatus 100. According to embodiments of the method 300, the honeycomb structure 10 can be positioned in various orientations within the plugging apparatus 100, particularly with first end face 18 or the second end face 20 (see FIG. 4A) in a downward position relative to the piston 50. In some aspects of the method 300, those with ordinary skill in the art can appreciate that the plugging apparatus 100 could be modified to allow for the simultaneous or sequential injection of the plug of material 44 into both of the first end face 18 and second end face 20, particularly the first subset 24 and second subset 26 of cells 22.

Figure 5:
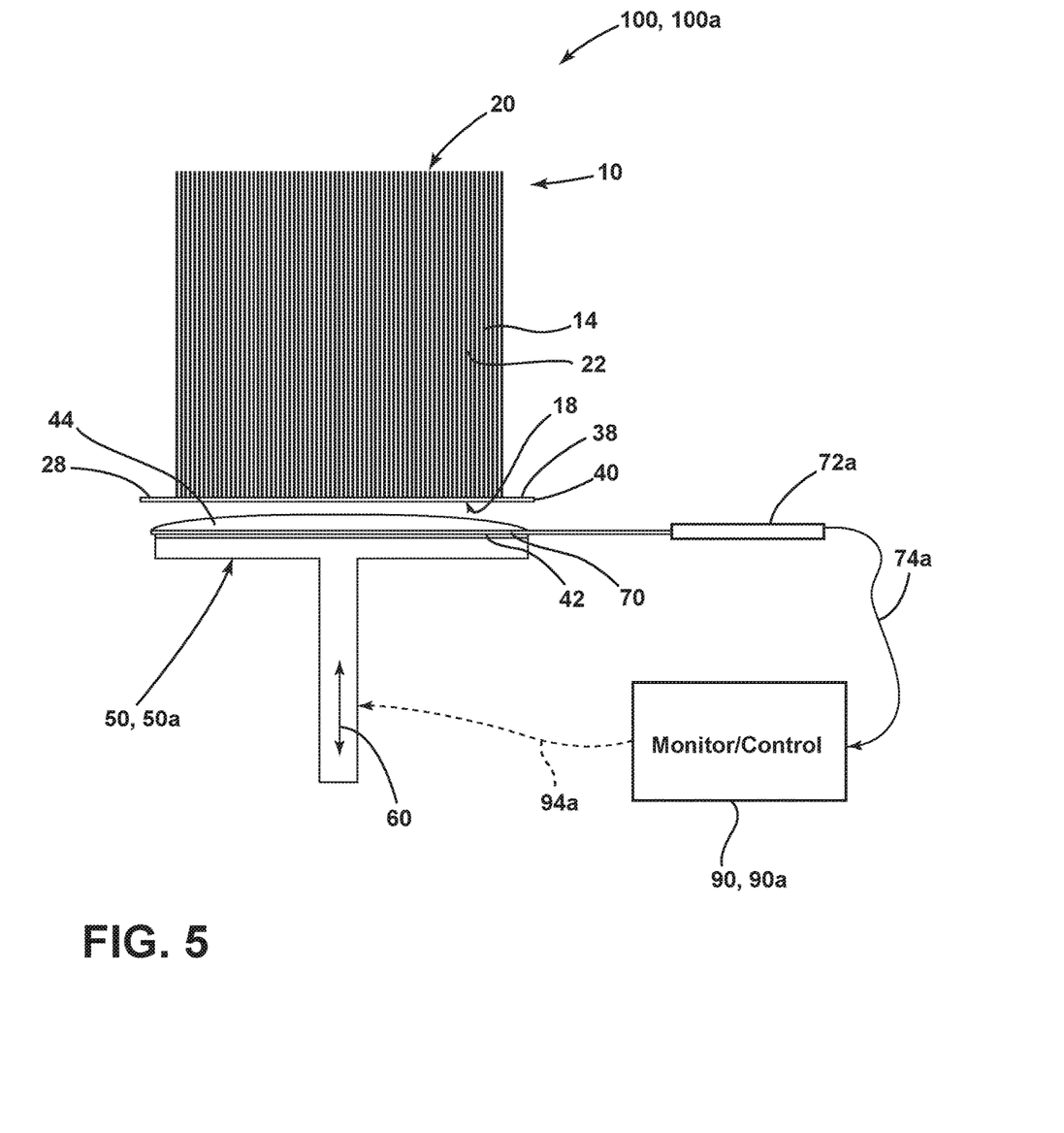
FIG. 5 is a side, cross-sectional view of a plugging apparatus, as configured with a pressure sensor film comprising a plurality of pressure sensors coupled to a controller.

Turning to FIG. 5, the method 300 (see FIG. 3) for plugging a subset of cells 22 of a honeycomb structure 10 can employ a plugging apparatus 100 or an adjustable plugging apparatus 100*a*. In most respects, the plugging apparatus 100*a* depicted in FIG. 5 is similar to the plugging apparatus 100 depicted in FIG. 4B-4D, with like-numbered elements having the same function and structure unless otherwise noted. One difference between the plugging apparatus 100 and adjustable plugging apparatus 100*a* is that the adjustable plugging apparatus 100*a* is controlled by a controller 90*a* to apply the force 60 with an adjustable piston 50*a* (via optional connection 94*a*) to the film material 42 to push the plug of material 44 into the cells 22 of the honeycomb structure 10. In particular, the plugging apparatus 100*a* can be employed to make adjustments to the force 60 applied to the adjustable piston 50*a*, and the plug of material 44 disposed thereon, relative to the first end face 18 (or second end face 20) of the honeycomb structure 10 in response to the plurality of pressures measured as part of step 350 during the plugging that occurs during step 340. The net result is that the adjustable plugging apparatus 100*a* can be employed to adjust the force 60 applied to the adjustable piston 50*a* relative to cells 22 to improve the uniformity of the depth of each of the plurality of plugs 62 (see FIG. 4D) formed in the plugged honeycomb structure 200.

With regard to the method 300 depicted in FIG. 3, as employing the adjustable plugging apparatus 100*a* or plugging apparatus 100 shown in FIG. 5, the method can be conducted in a similar fashion as outlined earlier. Notably, steps 310, 320 and 330 of the method 300 are conducted with plugging apparatus 100a, as detailed according to the description outlined earlier in connection with plugging apparatus 100 (see FIGS. 3 and 4A-4D, and corresponding description). According to this embodiment of the method 300 employing the adjustable plugging apparatus 100a, the method comprises a step 340 for applying a force 60 to the film material 42 to push the plug of material 44 through the plurality of openings 30 (see FIG. 4A) of the mask 28 and into the plurality of cells 22 of the honeycomb structure 10 based at least in part on the plurality of pressures obtained during step 350. In particular, the force 60 is generally applied in the direction shown in FIG. 5 to the film material 42 by the adjustable piston 50a, thereby forcing the plug of material 44 through the openings 30 of the mask 28 and into the first subset 24 of the plurality of cells 22 of the honeycomb structure 10 (or second subset 26 of cells 22 for a mask positioned on the end face 20). As the plug of material 44 is pushed into the first subset 24 of cells 22, a plurality of plugs is formed (similar to the plurality of plugs 62 shown in FIG. 4D). Also according to step 340, the adjustable piston 50a can be retracted away from the first end face 18 of the honeycomb structure 10 and the mask 28 and the film material 42 removed from the structure 10.

Referring again to FIGS. 3 and 5, the method 300 for plugging a subset of cells of a honeycomb structure 10, as employing plugging apparatus 100 or adjustable plugging apparatus 100a, also comprises a step 350 for measuring a plurality of pressures within the plurality of cells 22 during the applying step 340. A plurality of pressures is measured as part of step 350 within the cells 22 during the step 340 for applying a force 60 to the film material 42 to push the plug of material 44 through the plurality of openings 30 of the mask 28 and into the plurality of cells 22. As such, step 350 can be employed to monitor the pressure in the first subset 24 of the cells 22 (or the second subset 26 of the cells 22) as the plug of material 44 is introduced and pushed into these cells. In embodiments of the method 300, as employing the plugging apparatus 100 or adjustable plugging apparatus 100a, step 350 can be conducted such that output data from a pressure sensor film 70 is evaluated by a sensor monitor 72a, as coupled via wiring 74a to a monitor 90 or controller 90a, respectively. The pressure sensor film 70 can be disposed between the film material 42 and the plug of material 44. Further, in embodiments, the pressure sensor film 70 can comprise a plurality of pressure sensors (e.g., as comparable to the pressure sensors 72 depicted in FIGS. 4B-4D). In embodiments of the method 300 employing plugging apparatus 100 or adjustable plugging apparatus 100a, the monitor 90 or the controller 90a, respectively, can display the output data from the pressure sensor film 70, e.g., as associated with each of the pressure sensors 72.

Referring again to the method 300, as employing the adjustable plugging apparatus 100a, the applying step 340 further comprises adjusting the force 60 applied to the film material 42 to develop a target pressure within the plurality of cells 22 of the honeycomb structure 10, the target pressure based at least in part on the plurality of pressures within the plurality of cells 22 of the honeycomb structure 10. In embodiments, the adjustments of the force 60 during the applying step 350 are made to the adjustable piston 50a to push the plug of material 44, according to the target pressure, to a predetermined depth within the plurality of cells 22. In embodiments of the adjustable plugging apparatus 100a, the force 60 applied by the adjustable piston 50a can be effected by the controller 90a, as coupled to one or more linear actuators (not shown) via optional wiring 94a (note that wiring 94a is not required to be present for configurations of plugging apparatus 100 that rely on a monitor 90 rather than a controller 90a). Advantageously, the plurality of pressures measured during step 350 can be employed by the method 300, and the controller 90a of the adjustable plugging apparatus 100a, to effect control of the adjustable piston 50a during step 340 as the plug of material 44 is introduced into the honeycomb structure 10 to improve the uniformity of the depth of the plurality of plugs 62 formed in the structure 10.

According to some implementations of the method 300 employing the plugging apparatus 100 or adjustable plugging apparatus 100a (see FIGS. 3 and 5), steps 340 and 350 are conducted such that the plurality of pressures measured in the cells 22 is a plurality of region pressures, with each region corresponding to a portion of the plurality of cells 22. Further, steps 340 and 350 can be conducted with the plugging apparatus 100 or 100a such that multiple pressures are measured within the honeycomb structure 10 by virtue of the monitor 90 or controller 90a, respectively, as coupled to a pressure sensor film 70 that comprises a plurality of pressure sensors (e.g., as comparable to the pressure sensors 72 depicted in FIG. 4B). More particularly, these pressure sensors, as arranged on the pressure sensor film 70, correspond to particular groups or regions of cells 22 at different locations on the first end face 18 (or second end face 20). In some implementations of the adjustable plugging apparatus 100a, the pressure data associated with these groups or regions of cells 22 can be employed by the method 300 to develop a target or average pressure for the cells 22. In embodiments, the target or average pressure for the cells 22 can then employed in step 340 to apply a particular force 60 to the adjustable piston 50a with an aim of achieving a substantially uniform depth of the plurality of plugs 62 within the plugged honeycomb structure 200.

Figure 6A:
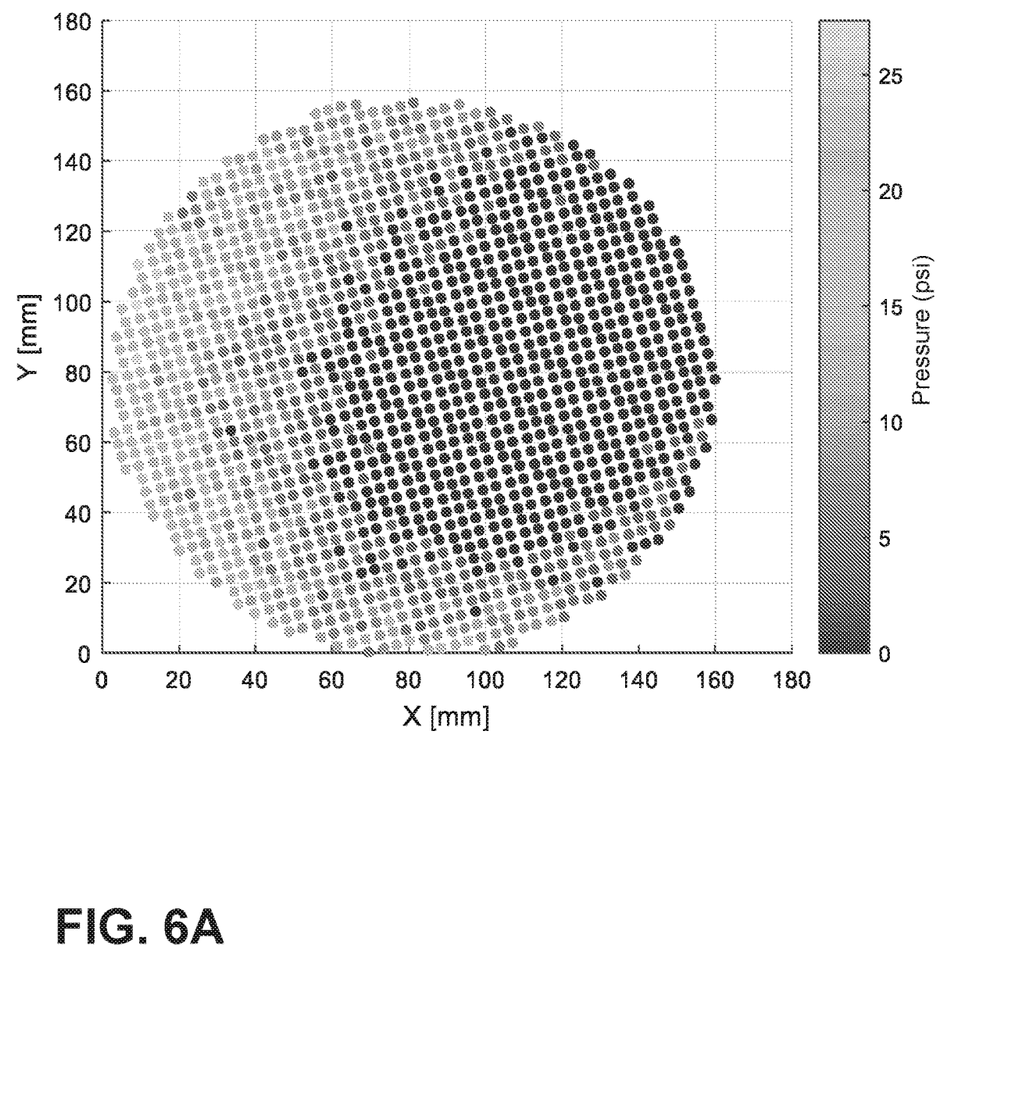
FIG. 6A is a pressure map of a honeycomb structure, as measured during a method for plugging a subset of cells of the honeycomb structure with a plugging apparatus as depicted in FIG. 5.

According to further implementations of these embodiments of the method 300, the pressure data (e.g., a plurality of region pressures) can also be employed to create a pressure map of the first end face 18 or second end face 20 of the honeycomb structure 10 that shows multiple pressures measured as a function of location or region of portions of the cells 22 (see FIG. 6A). In particular, the multiple, varying pressures associated with different portions of the cells 22 are depicted as solid circles having different shading. A pressure map developed by the adjustable plugging apparatus 100a according to the method 300 can then be used to conduct step 340 to employ adjustments to the adjustable piston 50a to provide the force 60 to the film material 42 to arrive at a particular target pressure within the plurality of cells 22 as the plug of material 44 is forced into these cells. In turn, the adjustments to step 340 can lead to a pressure map with a more uniform pressure distribution within the cells 22 or a pressure distribution within the cells 22 in which all pressures are at or above a target pressure. In addition, the method 300 can be conducted with the adjustable plugging apparatus 100a such that step 330 further comprises providing the plug of material 44 at a non-uniform thickness based at least in part on prior-measured output pressure data obtained from the step 350 (e.g., as obtained from one or more honeycomb structures previously made according to the method 300), as employing a pressure sensor film 70 with a plurality of pressure sensors.

Referring again to FIGS. 3 and 5, the method 300 can be employed with the plugging apparatus 100 or adjustable plugging apparatus 100a, upon completion of steps 310-350, to produce a plugged honeycomb structure 200, e.g., with a plurality of plugs 62 as located within a first subset 24 and a second subset 26 of cells 22 (e.g., as shown in FIG. 4D). At this point, the plugged honeycomb structure 200 can be removed from within the adjustable plugging apparatus 100a. According to embodiments of the method 300 employing the plugging apparatus 100 or adjustable plugging apparatus 100a, the honeycomb structure 10 can be positioned in various orientations within the apparatus 100a, particularly with first end face 18 or the second end face 20 in a downward position relative to the piston 50 or adjustable piston 50a, respectively. In some aspects of the method 300, those with ordinary skill in the art can appreciate that the plugging apparatus 100 or adjustable plugging apparatus 100a could be modified to allow for the simultaneous or sequential injection of the plug of material 44 into both of the first end face 18 and second end face 20, particularly the first subset 24 and second subset 26 of cells 22.

Now referring to FIG. 6A, a pressure map of a honeycomb structure is provided, as obtained from a method for plugging a subset of cells of a honeycomb structure with a plugging apparatus according to the disclosure. The pressure map depicted in FIG. 6A was developed during the plugging of a honeycomb structure with a plugging apparatus comparable to the plugging apparatus 100 or an adjustable plugging apparatus 100a, as detailed above. More particularly, the map shown in FIG. 6A presents pressure data collected by a controller or monitor (e.g., controller 90a or monitor 90 depicted in FIG. 5) coupled to a plurality of sensors disposed on a pressure sensor film, as configured comparably to the pressure sensor film 70 with a plurality of pressure sensors 72 outlined earlier (see FIGS. 4B-4D). The pressure sensors were arranged in a distribution within the pressure sensor film to correspond with the arrangement or distribution of the cells of the honeycomb structure. As is evident from FIG. 6A, solid circles of varying degrees of shading correspond to pressure values at various points on the face of the honeycomb structure, i.e., at various X/Y positions on the end face of the honeycomb structure having an approximate diameter of about 160 mm. Further, the pressure associated with the degree of shading is based on the scale shown on the right-hand side of the figure. Since the sensors employed to generate the map were arranged to correspond with the cells of the honeycomb structure, each solid circle shown in FIG. 6A corresponds to the particular cells in proximity to the sensor used to generate the pressure data of that solid circle. As such, the pressure map of FIG. 6A is a representation of the actual pressures observed in the cells of the honeycomb structure during the plugging operation of the method.

Referring again to FIG. 6A, the pressure map indicates that the pressures in the honeycomb structure prepared according to the method for plugging a subset of cells are significantly higher on the left-hand side of the figure, approaching 25 psi. The measured pressures, however, decrease from the left-hand side of the figure toward the right-hand side of the figure, with the lowest pressures less than 1 psi. As such, it is evident that the honeycomb structure depicted in FIG. 6A is characterized by significant pressure variability within its cells during the plugging operation.

Figure 6B:
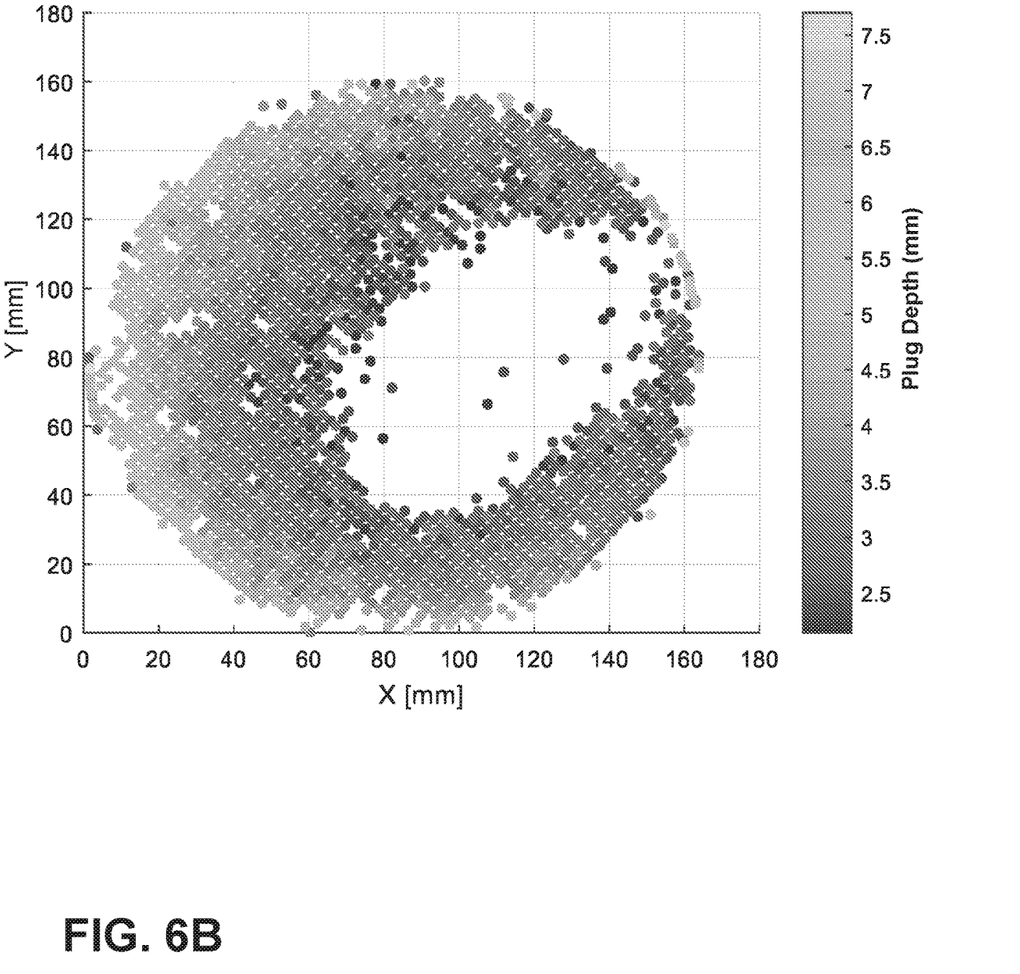
FIG. 6B is a plug depth map of the honeycomb structure of the FIG. 6A pressure map, as plugged according to the method for plugging a subset of cells of the honeycomb structure with a plugging apparatus as depicted in FIG. 5.

Referring now to FIG. 6B, this figure provides a plug depth map of the same honeycomb structure employed to produce the pressure map depicted in FIG. 6A. The plug depth map shown in FIG. 6B was developed by employing an x-ray CT scanner to measure the depth of the plug of material in each of the cells of the plugged honeycomb structure that was measured during the plugging method to generate the pressure map of FIG. 6A. Each of the solid circles shown in FIG. 6B is indicative of the depth in millimeters of the plug of material in a cell of the honeycomb structure. The shading of the solid circles corresponds to the depth of the plug of material observed for that particular cell according to the scale on the right-hand side of the figure. As such, the density of the solid circles shown in the plug depth map of FIG. 6B is greater than the density of the solid circles shown in the pressure map of FIG. 6A.

Referring again to FIG. 6B, the plug depth map indicates that the plug depths in the honeycomb structure prepared according to the method for plugging a subset of cells are significantly higher on the left-hand side of the figure, approaching 7.5 mm. The measured plug depths, however, decrease from the left-hand side of the figure toward the right-hand side of the figure, with some cells having no observable plug depths (i.e., plug depths of 0 mm). As such, it is evident that the plug depths observed in FIG. 6B appear to correlate with the pressure map of FIG. 6A. In particular, regions of the honeycomb structure with pressures of less than 1 psi were observed as having no observable plug depth. Conversely, regions of the honeycomb structure with pressures approaching 25 psi were observed as having plug depths approaching 7.5 mm.

Figure 6C:
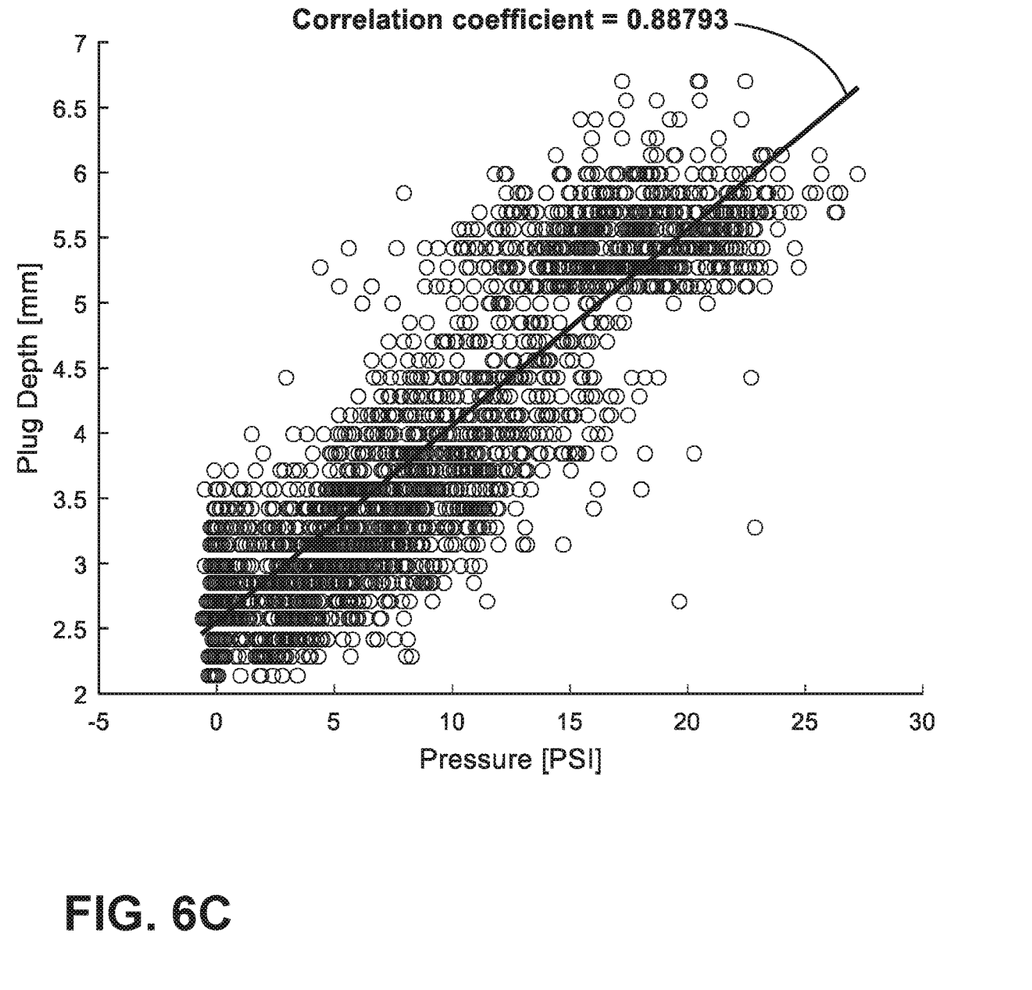
FIG. 6C is a plot of plug depth as a function of pressure based on the data from the pressure and plug depth maps depicted in FIGS. 6A and 6B.

Referring now to FIG. 6C, a plot of plug depth (mm) as a function of pressure (psi) is provided that is based on the pressure and plug depth data from the maps depicted in FIGS. 6A and 6B, respectively. As noted earlier, there is less pressure data from FIG. 6A as compared to the plug depth data of FIG. 6B and a cubic fit was applied to the lower spatial resolution pressure data to correlate these points to the plug depth data. As is evident from FIG. 6C, a good correlation was obtained between the plug depth data and the pressure data, as evidenced by a correlation coefficient of 0.89 with an exemplary relationship between plug depth and pressure given by: plug depth (mm)=0.1508*pressure (psi)+2.5516. For example, a 10 psi pressure results in an estimated plug depth of 4.06 mm and a 20 psi pressure results in an estimated plug depth of 5.57 mm. It should be understood, however, that the concepts and principles embodied by FIGS. 6A-6C can readily be employed by those with ordinary skill in the field of the disclosure to develop other relationships between plug depth and pressure for a particular combination of honeycomb structure geometry, plugging apparatus configuration and composition of the plug of material.

Referring again to FIGS. 6A-6C, the approach to developing the data in these figures can be employed according to the plugging methods and plugging apparatus of the disclosure to improve plug depth uniformity. The plugging apparatus and methods of the disclosure can be employed to generate data comparable to the data depicted in FIGS. 6A-6C to improve the uniformity of the plug depths observed in plugged honeycomb structures. For example, the data in FIG. 6C (or as developed from another honeycomb structure prepared according to the plugging methods of the disclosure) can be employed to obtain a lower bound pressure that correlates to an acceptable plug depth level for each of the plugs of the honeycomb structure. That is, a lower bound pressure can be set for the plugging method (e.g., during the applying step 340 depicted in FIG. 3 and described earlier) to ensure that a minimum plug depth is achieved. For example, if ceramic filter performance requires a minimum plug depth of 3.5 mm, one can configure the applying step of a method for plugging a subset of cells of the structure to ensure that the pressure observed (e.g., during the measuring step 350 depicted in FIG. 3 and described earlier) is 6.3 psi, as calculated based on the exemplary relationship between plug depth and pressure outlined above.

Referring once again to FIGS. 6A-6C, the plugging apparatus and methods of the disclosure can be employed to generate data comparable to the data depicted in FIGS. 6A-6C to improve the uniformity of the plug depths observed in plugged honeycomb structures by setting upper and lower bound pressures. For example, the data in FIG. 6C (or as developed from another honeycomb structure prepared according to the plugging methods of the disclosure) can be employed to obtain a lower bound pressure and an upper bound pressure that correlates to an acceptable plug depth level for each of the plugs of the honeycomb structure. That is, a lower bound and an upper bound pressure can be set for the plugging method (e.g., during the applying step 340 depicted in FIG. 3 and described earlier) to ensure that a plug depth between a lower and an upper limit is achieved. For example, if ceramic filter performance requires a plug depth between 3.5 mm and 6.0 mm, one can configure the applying step of a method for plugging a subset of cells of the structure to ensure that the pressure observed (e.g., during the measuring step 350 depicted in FIG. 3 and described earlier) is between a lower bound of 6.3 psi and an upper bound of 22.9 psi, as calculated based on the exemplary relationship between plug depth and pressure outlined above.

While exemplary embodiments and examples have been set forth for the purpose of illustration, the foregoing description is not intended in any way to limit the scope of the disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method for plugging a subset of cells of a honeycomb structure, the method comprising:
   covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure;
   bringing a film material and the honeycomb structure into contact with each other, the film material having an outer edge that also extends outwardly of at least a portion of the outer edge of the first end face of the honeycomb structure;
   applying a force to the film material with a piston to push a plugging material through the plurality of openings of the mask and into the plurality of cells of the honeycomb structure; and
   measuring a plurality of pressures within the plurality of cells of the honeycomb structure during the applying step;
   wherein the step of measuring a plurality of pressures within the plurality of cells is conducted by evaluating output pressure data from a plurality of pressure sensors disposed on a pressure sensor film, the pressure sensor film disposed between the film material and the plugging material;
   wherein the plurality of pressure sensors is disposed in a distribution on the pressure sensor film that corresponds with a distribution of the plurality of cells of the honeycomb structure; and
   wherein the plugging material comprises a non-uniform thickness based at least in part on prior-measured output pressure data from the plurality of pressure sensors disposed on the pressure sensor film.

2. The method of claim 1, wherein the plurality of pressure sensors is at least 10 pressure sensors.

3. The method of claim 1, wherein the plurality of pressure sensors is at least 10% of the total number of cells of the honeycomb structure.

4. The method of claim 1, wherein the step of measuring a plurality of pressures within the honeycomb structure is conducted such that the plurality of pressures is a plurality of region pressures, each region pressure corresponding to a portion of the plurality of cells of the honeycomb structure.

5. The method of claim 4, further comprising:
   monitoring the plurality of region pressures, wherein the monitoring is conducted such that the plurality of region pressures is recorded and displayed during the method.

6. The method of claim 4, further comprising:
   calculating an average pressure within the plurality of cells based at least in part on the plurality of region pressures.

7. The method of claim 6, further comprising:
   measuring a plurality of depths of the plugging material within the corresponding plurality of cells with an x-ray computed tomography (CT) scanner after the step of applying a force to the film material.

8. A method for plugging a subset of cells of a honeycomb structure, comprising:
   covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure;
   bringing a film material and the honeycomb structure into contact with each other, the film material having an outer edge that also extends outwardly of at least a portion of the outer edge of the first end face of the honeycomb structure;
   applying a force to the film material with a piston to push a plugging material through the plurality of openings of the mask and into the plurality of cells of the honeycomb structure; and
   measuring a plurality of pressures within the plurality of cells of the honeycomb structure during the applying step,
   wherein the step of applying a force to the film material further comprises adjusting the force applied to the film material to develop a target pressure within the plurality of cells of the honeycomb structure, the target pressure based at least in part on the plurality of pressures within the plurality of cells of the honeycomb structure.

9. The method of claim 8, wherein the step of measuring a plurality of pressures within the plurality of cells is conducted by evaluating output pressure data from a plurality of pressure sensors disposed on a pressure sensor film, the film disposed between the film material and the plugging material.

10. The method of claim 9, wherein the plurality of pressure sensors is at least 10 pressure sensors.

11. The method of claim 9, wherein the plurality of pressure sensors is at least 10% of the total number of cells of the honeycomb structure.

12. The method of claim 9, wherein the plurality of pressure sensors is disposed in a distribution on the pressure sensor film that corresponds with a distribution of the plurality of cells of the honeycomb structure.

13. The method of claim 12, wherein the plugging material comprises a non-uniform thickness based at least in part on prior-measured output pressure data from the plurality of pressure sensors disposed on the pressure sensor film.

14. The method of claim 12, wherein the step of measuring a plurality of pressures within the honeycomb structure is conducted such that the plurality of pressures is a plurality of region pressures, each region pressure corresponding to a portion of the plurality of cells of the honeycomb structure.

15. The method of claim 14, further comprising:
monitoring the plurality of region pressures, wherein the monitoring is conducted such that the plurality of region pressures is recorded and displayed during the method.

16. The method of claim 15, further comprising:
calculating an average pressure within the plurality of cells based at least in part on the plurality of region pressures.

17. The method of claim 16, wherein the target pressure is based at least in part on the average pressure within the plurality of cells of the honeycomb structure.

18. The method of claim 17, wherein the target pressure comprises a lower bound pressure and an upper bound pressure within the plurality of cells of the honeycomb structure.

* * * * *